March 15, 1932.   R. H. WHITE   1,849,560
TRACTOR
Filed April 28, 1930   3 Sheets-Sheet 1

INVENTOR
Rollin H. White
BY
Wayne M. Hart
ATTORNEY

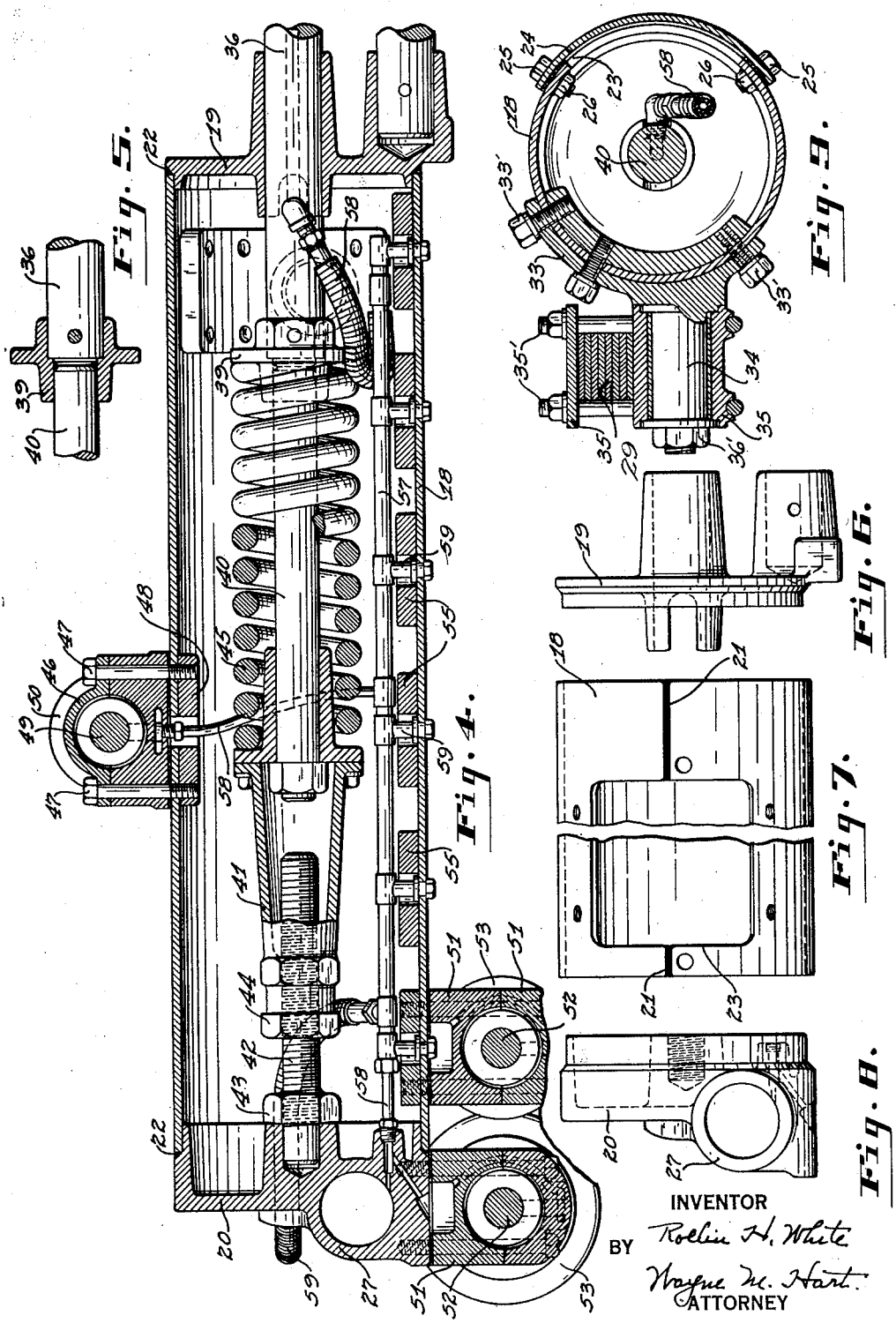

Patented Mar. 15, 1932

1,849,560

UNITED STATES PATENT OFFICE

ROLLIN H. WHITE, OF CLEVELAND HEIGHTS, OHIO

TRACTOR

Application filed April 28, 1930. Serial No. 448,096.

This invention relates to tractors and more particularly to tractors of the track laying type.

One of the objects of the invention is to provide a strong but light weight side frame for tractors of the track laying type.

Another object of my invention is to provide a side frame for track laying tractors which can be cheaply fabricated and readily assembled.

A further object of my invention is to provide a side frame which wholly encloses elements carried interiorly thereof so that dust and dirt cannot enter.

Still another object of my invention is to provide a sheet metal side frame formed in the major of a single plate which is bent and secured in tubular form.

Other objects of the invention will appear from the following description taken in connection with the drawings, which form a part of the specification, and in which:

Fig. 4 is a longitudinal section view of one of the side frames removed from the tractor.

Fig. 5 is a fragmentary sectional view of the jointed rods attached to one of the front idler wheels.

Fig. 6 is a side elevation of the front head of the side frame.

Fig. 7 is a side elevation of the side frame shell.

Fig. 8 is a side elevation of the rear head of the side frame.

Fig. 9 is a section taken on line 9—9 of Fig. 10.

Figure 1:
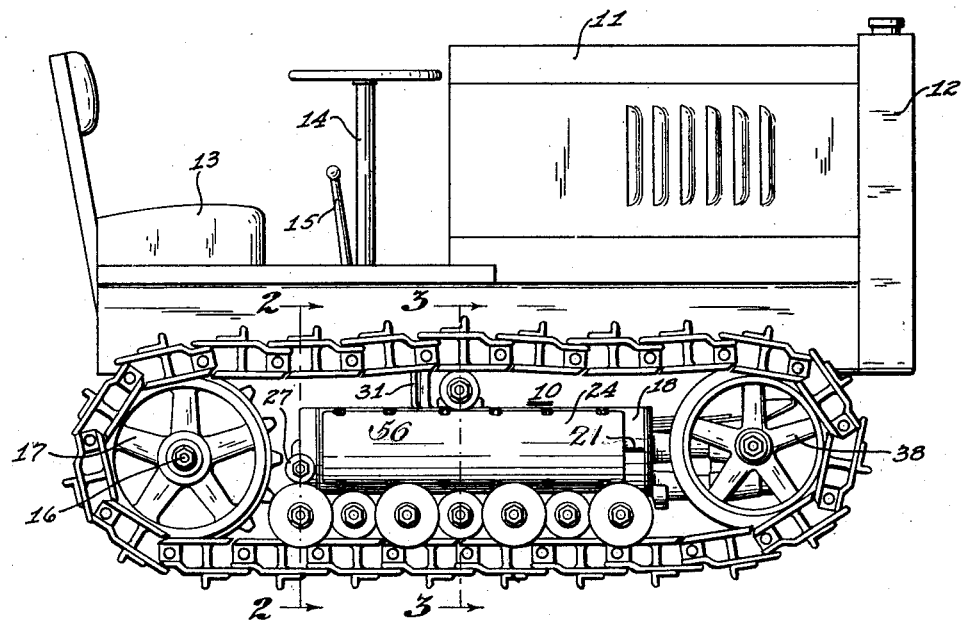
Fig. 1 is a side elevation of a tractor incorporating the invention.
Figures 2, 3:
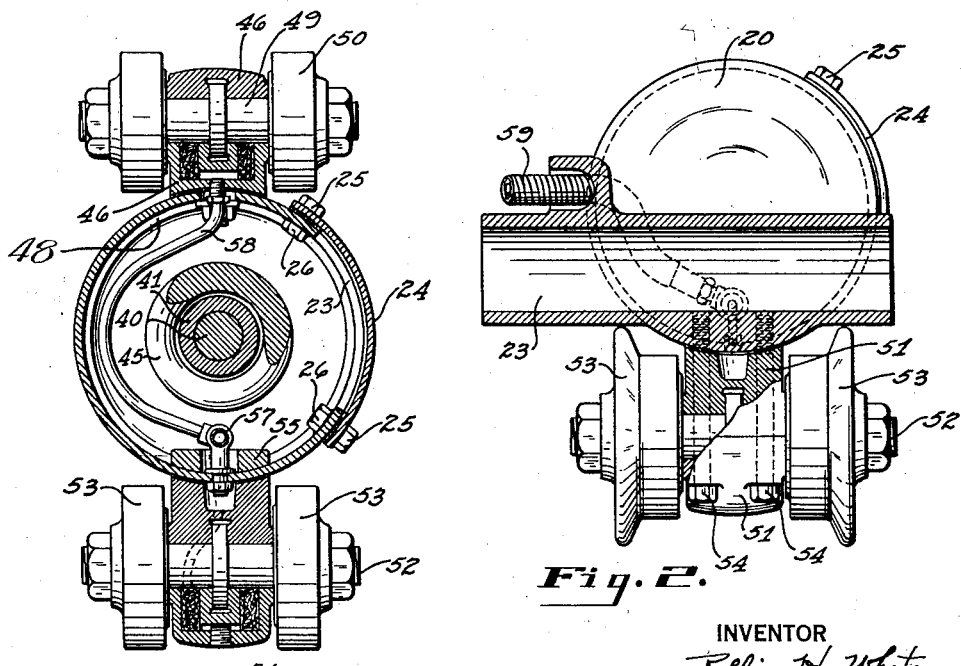
Fig. 2 is a sectional view of the same taken on line 2—2 of Fig. 1.
Fig. 3 is another sectional view of the tractor taken on line 3—3 of Fig. 1.
Figure 10:
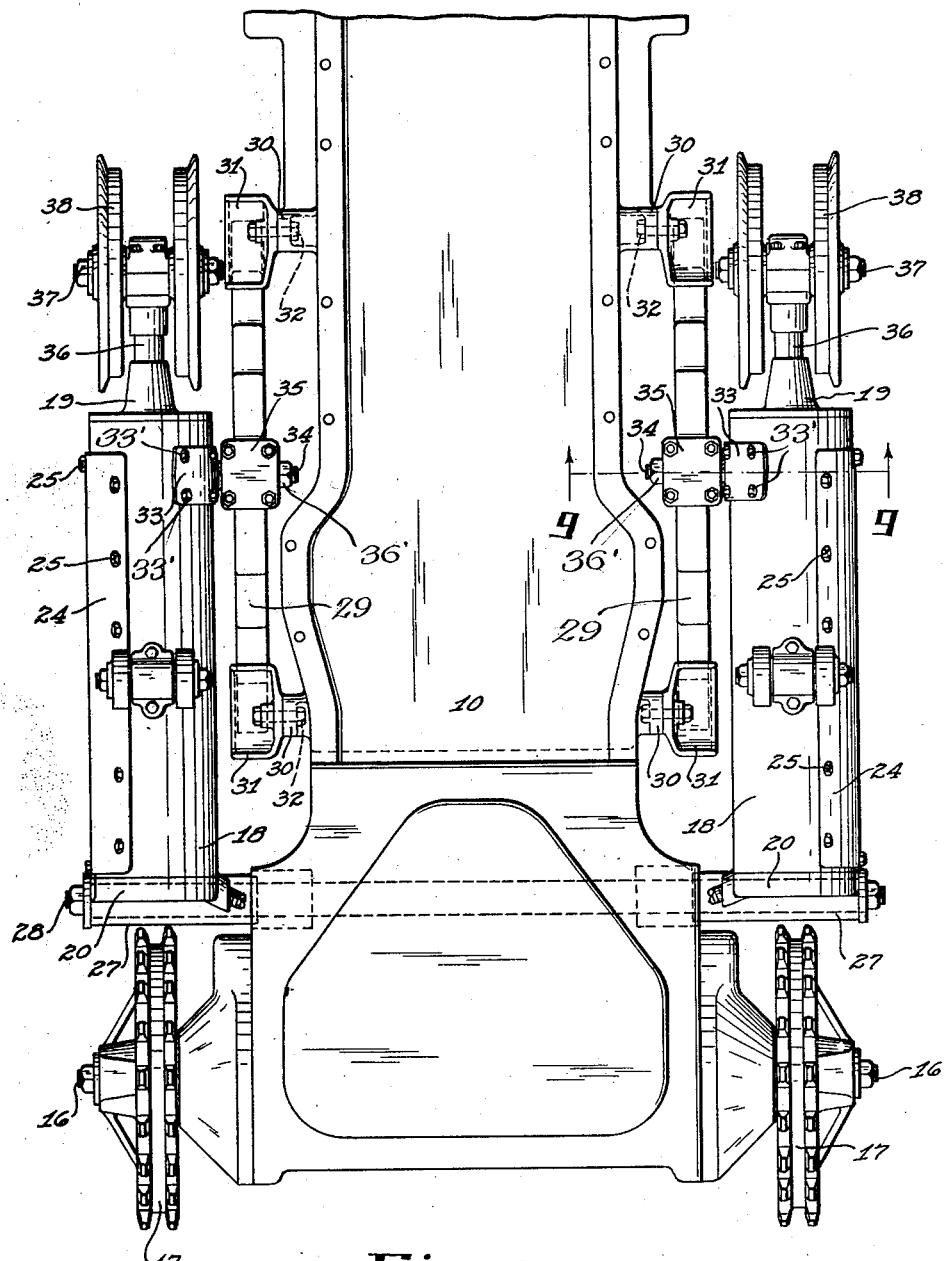
Fig. 10 is plan view of the tractor with the tracks and engine unit removed.

Referring now to the drawings by characters of reference, 10 indicates the main frame which also serves as the pan and support for the engine and for housing the transmission mechanism. This frame is preferably formed as a single casting, or as two castings bolted together in endwise relation. A suitable power plant or engine is mounted on the forward end of the frame, beneath the hood 11, and a radiator 12 is arranged in advance of the engine on the frame. A driver's seat 13 is carried at the rear end of the frame, and a steering lever 14 and change speed lever 15 extend from the frame intermediate the seat and the power plant. A pair of final drive axles 16 extend from the sides of the rear portion of the frame and have driving sprockets 17 secured thereto, suitable transmission mechanism being provided intermediate the power plant and the axles to rotate the same in a conventional manner.

A driving and supporting unit is arranged on each side of the main frame. The units are similar and include a side frame which is formed of a sheet metal cylinder or shell 18, a front header 19 and a rear header 20. The cylinder is formed preferably from a single sheet of material which is bent into tubular form with the turned edges welded together as shown at 21. The headers are formed to partially telescope the ends of the shell and to enclose the same, the headers being welded to the ends of the shell as indicated at 22. The shell is provided with an elongated opening 23 along one side to permit access to the interior thereof, a cover 24 being detachably secured to tightly enclose such opening, through means of bolts 25 which are screwed through the shell into nuts 26 welded to the interior of the shell.

The frames are pivotally connected to the main frame at their rear ends, in advance of the sprockets 17. The rear headers of the frames are, preferably, formed as castings which have transversely extending sleeves 27 which are rotatably secured upon a dead shaft 28 extending through the main frame. Each side of the main frame is formed with a pair of bosses 30 to which brackets 31 are secured by the bolts 32, the ends of leaf springs 29 being slidably supported by the brackets. A bracket 33 is secured by bolts $33^1$ to each reinforced portion of the side frame shell intermediate the ends of the springs and a shaft 34 extends from each and clamps 35 and U bolts $35^1$ secure the springs pivotally upon the shafts 34, a nut $36^1$ securing the clamps from lateral displacement. It will be seen that the side frames can rock vertically relative to the main frame and that they provide a resilient support for the forward end of the main frame.

A front idler is carried by the forward end of each side frame. The front header of each side frame is formed to provide an elongated bearing through which a rod 36 extends, there being a shaft 37 carried by the forward end of each rod upon which an idler roller 38 is rotatably mounted. The rear ends of the rods are pinned to a flanged union 39 within the tubular side frame, and a rod 40 is welded in the unions. A carrier 41 supports the rear end of each rod 40, being screwed upon studs 42 which are screwed through nuts 43 welded to the inner face of each rear header 20, a lock nut 44 engaging each carrier. A coil spring 45 extends between the carriers and the unions 39, and serve to resist a force tending to move the front idlers rearwardly.

A two part bracket structure 46 is secured by bolts 47 to the upper wall of each side frame shell, there being a plate 48 welded to the interior of each shell through which the bolts are screwed. Carried by the bracket structure is a shaft 49 to which is fixed a roller 50. A plurality of aligned lower roller units are also secured to the tubular side frames. Each unit includes a two part bracket structure 51 carrying a shaft 52 upon which rollers 53 are mounted, the brackets being secured by bolts 54 which extend through the frame and plates 55 welded to the interior of the frame. An endless articulated track 56 extends around each side frame and aligned sprocket, the lower roller units supporting the tractor on the tracks and the upper idler rollers 50 supporting the upper run of the tracks.

A lubricating system is arranged in each of the side frames. A main conduit 57 extends longitudinally of the frames and is connected with a reservoir and a pressure device through the conduit 58 extending through the rear frame heads. Branch conduits 59 lead from the main distributing conduit to the sealed ducts leading to the upper rollers, the lower rollers and the bearing, so that all bearings associated with the side frames can be lubricated from the interior.

The side frames can be readily fabricated and are light but rugged. The elements in the frames are entirely enclosed and protected from dirt and dust. The roller units, springs, idlers can be quickly assembled with the frames, and the frames can be quickly associated with or removed from the main frame. Access to the interior of the frames can also be quickly attained. The structure can be economically fabricated both with respect to material and labor.

Although this invention has been described in connection with certain specific embodiments, the principles involved are susceptible of numerous other applications which will readily occur to persons skilled in the art, and the invention is therefore to be limited only as indicated by the scope of the appended claims.

What I claim is:—

1. In a track laying tractor, a side frame comprising a sheet metal shell, headers closing the ends of the shell, reinforcing plates secured interiorly of the shell, roller carrying brackets, and bracket securing means through the shell and the reinforcing plates.

2. In a track laying tractor, a side frame comprising a sheet metal shell, headers closing the ends of the shell, and roller carrying means supported by one of the headers.

3. In a track laying tractor, a side frame structure comprising a metal shell, headers closing the ends of the shell, a roller carrying shaft extending through one header and secured interiorly of the shell, and means for adjusting the shaft axially.

4. In a track laying tractor, a side frame comprising a shell, headers closing the ends of the shell, idler carrying shaft means extending through one of the headers and movable axially relative thereto, shaft anchoring means in the shell and secured to the other header, a flange extending from the shaft means in the shell, and a tension spring surrounding the shaft means intermediate the flange and the anchoring means.

5. In a track laying tractor, a side frame comprising a metal shell, headers closing the ends of the shell, a front idler beyond one of the headers, and carrying means for the idler extending through one of the headers and secured to the other header.

6. In a track laying tractor, a side frame structure comprising a metal shell, headers closing the ends of the shell, a roller carrying shaft axially movable through one of the headers, means for anchoring the shaft within the shell, and tension means within the shell restricting the inward movement of the shaft.

In testimony whereof, I have hereto signed my name.

ROLLIN H. WHITE.